United States Patent [19]

Habib, Jr.

[11] 4,276,540
[45] Jun. 30, 1981

[54] REMOTE CYCLE ALARM SYSTEM

[76] Inventor: Fred G. Habib, Jr., 6231 W. Newport, Chicago, Ill. 60634

[21] Appl. No.: 77,894

[22] Filed: Sep. 24, 1979

Related U.S. Application Data

[63] Continuation-in-part of Ser. No. 839,985, Oct. 6, 1977, Pat. No. 4,188,614.

[51] Int. Cl.³ ............................................. B60R 25/10
[52] U.S. Cl. ........................................ 340/63; 116/70; 200/42 R; 307/10 AT
[58] Field of Search .................. 340/63, 65, 539, 541, 340/568, 693; 307/10 AT; 200/42 R, 85 R; 116/33, 70, 82, 98

[56] References Cited

U.S. PATENT DOCUMENTS

| 597,891 | 1/1898 | Walstron et al. | 340/63 |
| 3,453,591 | 7/1969 | Perez | 307/10 AT X |
| 3,714,628 | 1/1973 | Sloger | 307/10 AT X |
| 3,755,778 | 8/1973 | Kennedy et al. | 200/42 R X |
| 3,824,536 | 7/1974 | Cherico | 340/568 X |
| 3,882,453 | 5/1975 | Mule | 340/65 |
| 4,188,614 | 2/1980 | Habib, Jr. | 200/42 R X |

Primary Examiner—John W. Caldwell, Sr.
Assistant Examiner—Joseph E. Nowicki
Attorney, Agent, or Firm—Edward D. Gilhooly

[57] ABSTRACT

A remote cycle alarm system for preventing theft of motorcycles, bikes and other like vehicles includes a housing which is positioned on a support surface for cooperative engagement with a wheel of a vehicle. Actuating devices are provided on the housing for generating contact closures. A transmitter is also provided on the housing and is responsive to the actuating devices upon a contact closure for transmitting signals. A receiver is utilized to receive the transmitted signals from the transmitter at a remote distance away from the transmitter. In one embodiment the circuitry is enclosed within a pressurized chamber having a pressure responsive device to provide a signal indicating depressurization.

4 Claims, 9 Drawing Figures

U.S. Patent Jun. 30, 1981 Sheet 1 of 3 4,276,540
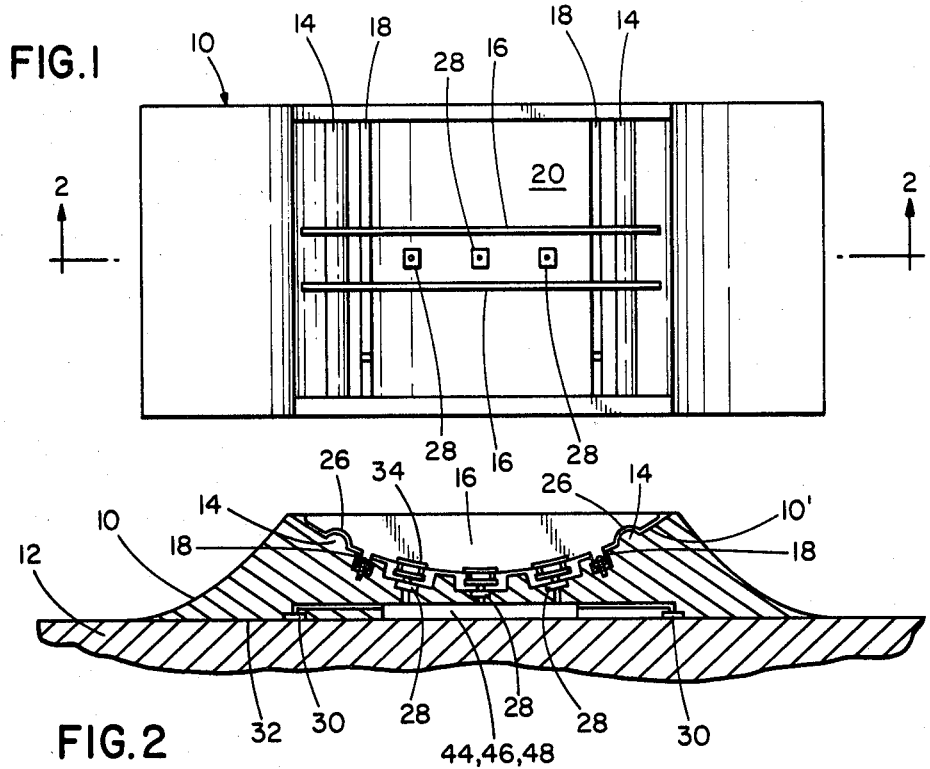
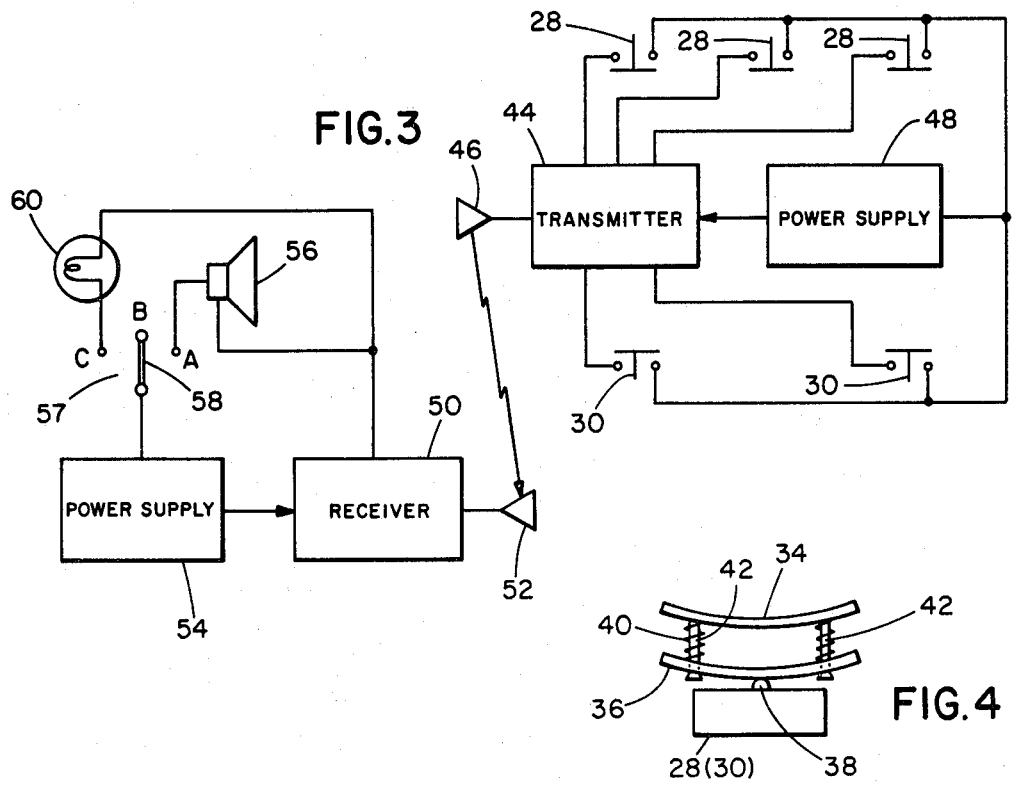

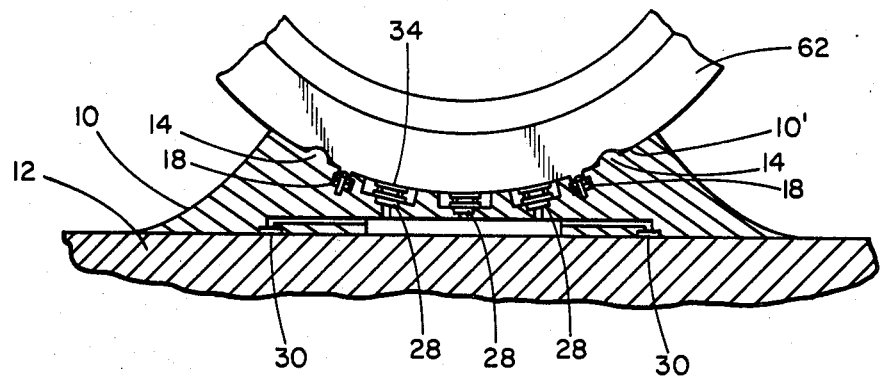
FIG.5
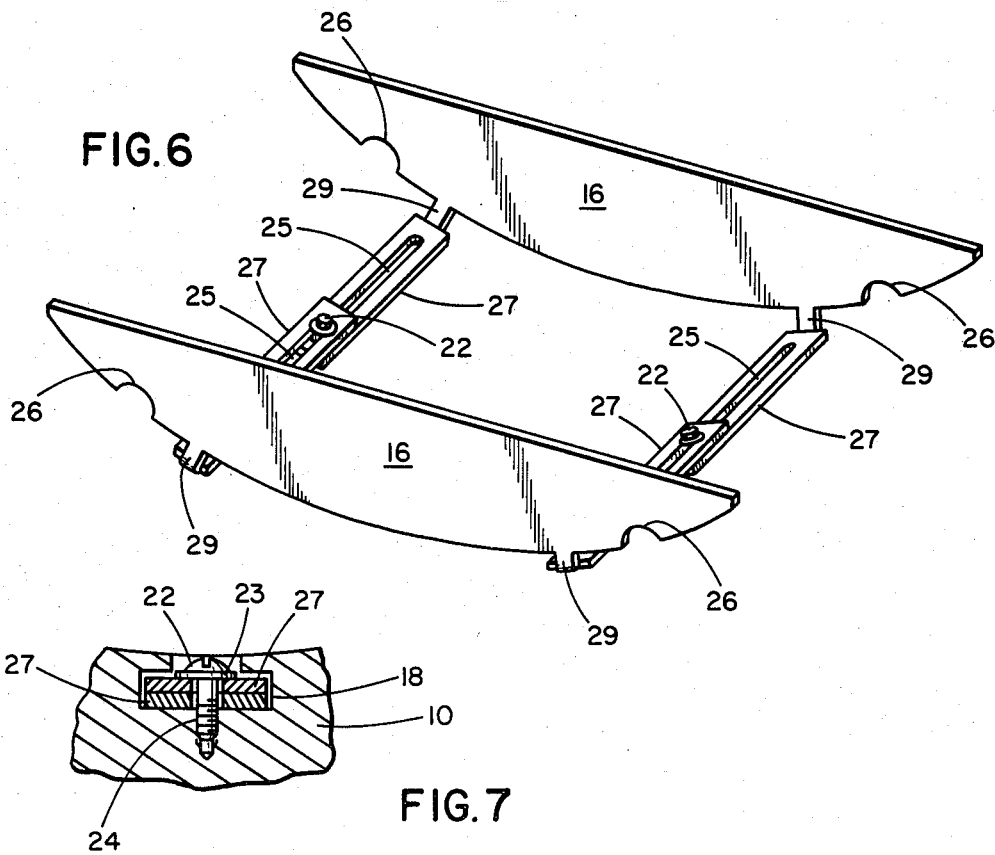
FIG.6
FIG.7

4,276,540

REMOTE CYCLE ALARM SYSTEM

BACKGROUND OF THE INVENTION

This application is a continuation-in-part of my co-pending application Ser. No. 839,985, filed Oct. 6, 1977; now U.S. Pat. No. 4,188,614.

This invention relates generally to anti-theft or alarm systems for motorcycles, bicycles and the like and more particularly, it relates to a remote cycle alarm system which provides an audible signal at a remote distance from a motorcycle so as to alert or warn an owner when the motorcycle is being tampered with by unauthorized persons, such as in the case of an attempted theft of the cycle and the like.

It has been generally encountered in recent years that the popularity of motorcycles, bicycles, and other like vehicles have increased tremendously. Accompanying this popularity of such vehicles there has been an increase in the theft rate of cycles and bicycles, particularly in high density urban areas.

The prior art methods of preventing theft by locking a wheel, steering column and other similar parts have been found to be ineffective since the locking device can be rendered inoperative or the entire vehicle, lock and all, can be transported away. There have also been attempts to prevent such theft by the use of audible alarms adjacent or near the vehicle to either alert the owner or others or to discourage the thief. However, due to numerous circumstances these have proved to be far from successful in preventing thefts since the audible alarm is either ignored or disengaged.

It is therefore desirable to provide a remote alarm system having a remote audible alarm which is portable and can be carried by an owner to alert him of an attempted theft even when the person is at a distance remote from physical position of the cycle and the like.

SUMMARY OF THE INVENTION

Accordingly, it is an object of the present invention to provide a remote cycle alarm system which has all of the aforementioned features and yet overcomes all of the disadvantages encountered in the prior art devices.

It is another object of the present invention to provide a remote alarm system having a remote audible alarm which is portable and can be carried by the owner to alert him of an attempted theft when he is at a remote distance from the vehicle.

It is another object of the present invention to provide a remote cycle alarm system having a transmitter means for transmitting signals to a receiver means at a remote distance from the vehicle for alerting an owner of an attempted theft.

It is still another object of the present invention to provide a remote cycle alarm system having actuating means positioned on a frame for generating signals to a remote receiver for alerting an owner of an attempted theft.

It is still another object of the present invention to provide a new and improved remote cycle alarm system having a base with adjustable mounting means for accommodating various size wheels of vehicles.

It is still another object of the present invention to provide a cycle alarm system having a remote receiver with testing means for checking the operation of the transmitter.

A further object of the present invention is to protect the circuit elements of a remote alarm system by providing a pressure chamber containing a pressure device responsive to tampering resulting in loss of pressure in the chamber.

In accordance with these aims and objectives, the present invention is directed to a remote cycle alarm system for preventing theft of motor cycles, bicycles and other like vehicles which may be utilized in conjunction with an improved frame means utilized to engage a wheel of a vehicle. The frame includes actuating means to activate a transmitting device for transmission of a signal of a selective range in response to unauthorized attempts to move or otherwise alter the position of the vehicle on the frame. Portable receiver means is utilized to receive the transmitted signals and audibly alert the user of the attempted theft without the user being in visual sight of the cycle and the like.

The present system further includes adjustable mounting or centering means in the housing means for accommodating various size wheels of the vehicles to maintain the wheel in the central portion of the housing means and over the actuating means. In addition, testing means can be incorporated into the receiver means for checking the operation of the transmitter means. The instant invention is particularly efficient and economical in providing a remote cycle alarm system since it comprises a minimum of components which are readily assembled during manufacture. In one embodiment of the invention; the switching means along with the circuit elements is encased in a pressurized chamber along with a pressure responsive element to provide a remote alert when the seal of the chamber is broken to prevent tampering which attempts to disrupt the circuitry of the system.

BRIEF DESCRIPTION OF THE DRAWINGS

These and other objects and advantages of the present invention will become more fully apparent from the following detailed description when read in conjunction with the accompanying drawings wherein:

FIG. 1 is a top plan view of the housing of a first embodiment of the present invention;

FIG. 2 is a side elevational view, partly sectionalized, taken along the line 2—2 of FIG. 1 showing the various components of the present invention;

FIG. 3 is a schematic block diagram of the remote cycle alarm system, according to the present invention;

FIG. 4 is an exploded side view of the micro-switches, according to the present invention;

FIG. 5 is an exploded view of the tire in cooperative engagement with the micro-switches, according to the present invention;

FIG. 6 is a prospective view of the adjustable mounting means according to the present invention;

FIG. 7 is a partly sectionalized view of the locking means, according to the present invention;

DETAILED DESCRIPTION OF THE PREFERRED EMBODIMENT

Figure 8:
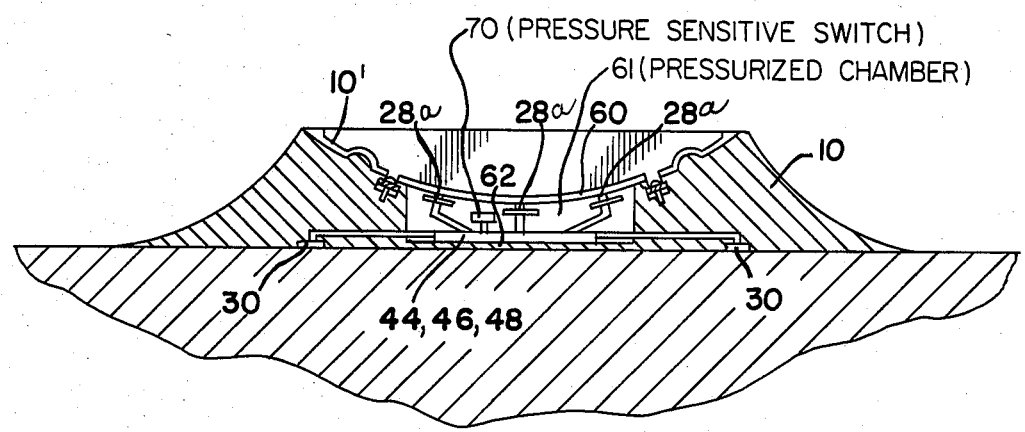
FIG. 8 is a side elevational view of another embodiment of the present invention.

Referring now in detail to the drawings, there is shown in FIGS. 1 and 2 a remote cycle alarm system of the present invention comprising a housing or base 10 formed of any suitable material for operational contact with a wheel (not shown) of a vehicle. Housing 10 is illustrated as being positioned on a support surface such as the ground or floor 12 but it may be supported in any other suitable manner. Like reference numerals are employed throughout the drawings to designate the like parts.

Housing 10 is provided on its upper surfaces with a concave upper surface 10' having a pair of elongated protrusions or speed bumps 14 which are to receive the tire of a vehicle (not shown). Adjusting mounting means in the form of a pair of slidable side panels 16 are respectively arranged on the housing 10 for horizontal movement along channels or tracks 18 formed in parallel relationship to speed bumps 14. Once the wheel is positioned between the speed bumps 14 to contact central portion 20 of the base, the adjustable side panels can be secured fixedly in place by conventional locking means such as a screw 22, a lock washer 23 and a threaded hole 24 in the housing (FIG. 7) so as to accommodate and maintain the various size tire treads of vehicles in the centered position of the housing and over actuating means 28. It will be readily understood by those skilled in the art that the side panels 16 can be provided with notches 26 for co-mating with the speed bumps 14 and slots 25, as seen in FIG. 6, for cooperation with the locking means.

Actuating means consisting of plurality of micro-switches 28, 30 are further provided in the housing 10. Two of the micro-switches 30 are arranged so as to be substantially equally spaced from the central portion 20 and are disposed in the bottom 32 of the base 10. While the micro-switches 30 are normally in the closed position, they are caused to open by the weight of the housing when the bottom 32 contacts the floor 12. The switches 28 are positioned to be substantially in the middle of central portion 20 of the base 10 so as to be in surrounding contact relationship with the crown portions of the tire or wheel to be mounted thereon. Similarly, the three micro-switches 28 are normally in the closed position until contact with the wheel of the vehicle whereby the weight thereof causes the switches 28 to be transferred to the open position. The operation of the actuating means will be described more fully hereinafter.

FIG. 4 shows an exploded view of the switches 28, 30. The actuating means further comprises a "floating" contact plate 34 and a fixed plate 36 for contacting a button or knob 38 on the micro-switches 28, 30. Spring means such as coil springs 40 are disposed around guide posts 42 which are interposed between the plates 34 and 36. In use, the "floating" contact plate 34 are arranged to contact circumferentially the crown portions of the tire thereby compressing the spring 40 and depressing the button 38 to open the contacts of the micro-switches. If a person attempts to tamper with the vehicle, he will cause one or more of the springs 42 in the micro-switches 28, 30 to flex back into an extended position causing closure of one or more corresponding contacts.

As can be seen from FIG. 3 of the drawings, there is shown a schematic block diagram of the remote cycle alarm system comprising of a transmitter means 44 for transmitting signals via an antenna 46 of any suitable type. A power supply 48 is utilized to supply power to the transmitter. The power supply 48 can be a conventional D.C. supply such as a battery or 120 VAC supply. The transmitter 44 is capable of transmitting signals only when one or more of the micro-switches 28, 30 shown in the open position are transferred to the closed position. The transmitter 44, antenna 46 and power supply 48 can be mounted in any convenient location in the bottom 32 of the housing 10.

A portable remote receiver means 50 receives the transmitted signals by the transmitter means 44 via an antenna 52. A power supply 54 is similar to the power supply 48, which can be a D.C. type or A.C. type. An alarm means such as a horn 56 is provided in the receiver means 50 to produce an audible sound when the arm 58 of a three-positioned toggle switch 57 is in position "A" and transmitted signals are received by the receiver 50. While there has been shown only one receiver, it will be apparent to those skilled in the art that a second receiver with an audible alarm can be provided to be placed in the immediate area of the vehicle for frightening or scaring potential thieves away.

In order to check the operation of the transmitter 44 and receiver 50, the arm 58 of the switch 57 can be switched from the off position "B" to the test position "C". The test means consisting of switch 57 and an indicator light 60 enables the owner to check the operation of the system. Particularly, with the switch 57 in position "C" the wheel of the motorcycle can be raised or the entire base can be raised to see if the indicator light 60 will become lit.

FIG. 5 illustrates a wheel or tire 62 of a vehicle positioned in co-operative engagement over the three micro-switches 28. Each of the contact plates 34 contacts a different circumferential portion of the crown of the tire 62 for opening the contacts of the micro-switches 28.

In FIG. 6, there is shown a prospective view of the slidable side panels 16 depicting in detail the slots 25 formed in overlapping horizontal plates 27. The screws 22 are inserted through the overlapping plates 27 via the slots 25 and tightened into the threaded holes 24 (FIG. 7) in the housing 10 for securing fixedly the side panels in the channels 18. The slidable side panels 16 are further provided with downwardly extending tabs or projections 29 for fixed attachment with the horizontal plates 27. It is important to note that slotted bars or the like could be used equally well as the plates 27. As can be seen from FIG. 2, the side panels 16 are disposed vertically and perpendicular to the plane of the housing for sliding horizontally along the channels 18. It should be also understood to those skilled in the art that various other means for centering the tire over the micro-switches 28 could be used such as slidable rods or bars for abutting the tire.

In operation, the housing 10 is positioned on the support surface 12 and the wheel 62 of the cycle is rolled onto the central portion 20 of the housing 10 over the micro-switches 28. The side panels 16 are slid into co-operative engagement with the sides of the wheel of the vehicle. Then, the cycle is rolled off the housing 10 and the screws 22 are tightened to fixedly secure the side panels thereby insuring proper centering of the wheel over the micro-switches 28. Once the side panels are correctly adjusted, the cycle is rolled back onto the central portion of housing between the side panels. The toggle switch 57 is transferred from the off position "B" to the on position "A". Under these circumstances, the micro-switches 28, 30 will be in their open position as shown in FIG. 3 of the drawings. If a person attempts to steal or tamper with the cycle by rolling it in either direction, he will cause lifting of the tire effected by the speed bumps 14 thereby resulting in one or more of the micro-switches 28, 30 to be transferred to the closed position. Then, the transmitter 44 will be activated to transmit signals to the receiver 50 enabling sounding of the horn 56. Once the horn has been activated, it can be de-energized by switching the toggle switch 58 from position "A" back to the off position "B". Thus, the owner of the vehicle may carry the portable remote receiver 44 anywhere within a pre-determined distance away from the transmitter 44, i.e., the range of the transmitter, and will be warned or alerted when anyone tampers with his vehicle.

Figure 9:
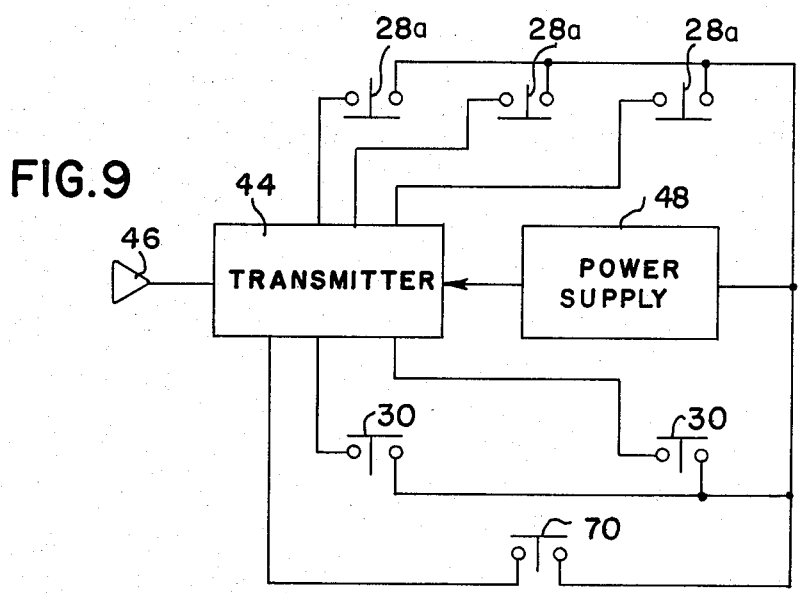
FIG. 9 is a partial schematic block diagram of the remote cycle alarm system of the embodiment of FIG. 8.

Referring to FIGS. 8 and 9 there is illustrated another embodiment of the remote cycle alarm of the invention. In FIG. 8 a housing 10 is shown having a concave upper surface 10' and a lower surface to contact a support surface similar as described with reference to the embodiment of FIGS. 1 to 7. Three switches 28a of the type of the previous embodiment are positioned immediately beneath in contact or near contact with a continuous and flexible metal or plastic sheet 60 covering an opening to a chamber 61. The chamber 61 is formed in housing 10 and extends an arcuate extent of the concave surface and possesses a width sufficient to contain the switches 28a. The micro switches 28a, supported in chamber 61 by brackets and the like (not shown) are pressure responsive and designed to be closed when the weight of a vehicle is not present. When a wheel is positioned on the sheet 60, flexing of sheet 60 occurs by virtue of the weight of the vehicle and the switches 28a are contacted beneath the sheet and close to function in the identical manner as switches 28 of the previous embodiment. Sheet member 60 may be coupled to housing 10 by any suitable technique (not shown) such as by an epoxy and the like to secure it thereto in a pneumatic sealing relationship to permit chamber 61 to be pressurized. The side surfaces and lower wall 62 of the housing further seal the chamber 61 about its periphery. The transmitter 44, antenna 46, and power supply 48, shown in schematic block diagram form, are mounted above the lower wall 62 within chamber 61.

Chamber 61 further includes at least one pressure switch 70 of standard construction which is in open state when the chamber is pneumatically pressurized to a predetermined level and closes when depressurization occurs. As shown in FIG. 9, the switch 70 is coupled to transmitter 44 by which the transmitter will be activated when the switch 70 is closed such as when a person attempts to tamper with the housing by penetrating into the chamber 61, containing circuit elements 44, 46 and 48, and causing depressurization. The other switches 28a and 30 act in a similar manner as the device of FIGS. 1 to 7. It should be apparent that the electrical leads coupling switches 30 to transmitter 44 are sealed pneumatically at their point of entry into chamber 61. Pressurization of chamber 61 may be achieved through a standard tire valve and stem (not shown) or other conduit and valve arrangement extending from chamber 61 to a selected external point on housing 10 to which an external pressure source such as a hand pneumatic pump or the like can be coupled. Alternatively, the chamber 61 may be in the form of an enclosed vessel (not shown) positioned in a cavity of the housing and having a separable portion to permit access to the circuit elements while having a suitable sealing connection to permit pressurization when closed.

In the embodiment of FIGS. 8 and 9, a person attempting to bypass switches 28a and 30 by destruction of the circuit elements such as the power source, transmitter, electrical leads, antenna and the like will be thwarted because penetration into housing 10 by a device or agent will depressurize chamber 61 and close switch 70.

From the foregoing description of the remote cycle alarm system embodying the present invention, it can be seen there is provided a new and improved alarm system wherein a portable remote receiver is responsive to a transmitter upon closure of one of a plurality of contacts to alert or warn the owner of an attempted theft. Further, there can be provided test means which includes an indicator light for checking the operation of the transmitter and receiver.

While there has been illustrated and described what is at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as a best mode contemplated for carrying out this invention, but the invention will include all embodiments falling in the scope of the appended claims.

I claim:

1. A remote alarm system for preventing theft of vehicles comprising:
   housing means being positioned on a support surface for co-operative engagement with a wheel of a vehicle,
   actuating means being disposed on said housing means for generating contact closures upon disengagement of said housing means with the wheel,
   transmitter means disposed in said housing means and being responsive to said actuating means upon a contact closure,
   said housing means having a chamber adapted to be pressurized and said chamber containing at least said transmitter means,
   said chamber including pressure sensitive means coupled to said transmitter means for generating an additional contact closure upon depressurization of said chamber due to tampering with said housing, and
   said transmitter means adapted to transmit a signal to a remote receiving means upon the occurrence of a contact closure or additional contact closure.

2. The alarm system according to claim 1 wherein actuating means includes at least one switch device positioned in said chamber.

3. The alarm system according to claim 2 wherein at least one said switch device is positioned beneath a flexible member forming a portion to enclose said chamber and having a surface adapted to contact a vehicle wheel.

4. The alarm system according to claim 2 wherein said actuating means further includes at least one switch device mounted on said housing and positioned exteriorly of said chamber for operative contact with the support surface, said at least one switch device mounted exteriorly of said chamber acting to generate contact closures upon disengagement of said housing means with the wheel.

* * * * *